United States Patent [19]
Merrill

[11] Patent Number: 5,246,318
[45] Date of Patent: Sep. 21, 1993

[54] ANNULAR HOLE CUTTER

[75] Inventor: Derrick Merrill, Dronfield, England

[73] Assignee: Rotabroach Limited, England

[21] Appl. No.: 929,322

[22] Filed: Aug. 11, 1992

Related U.S. Application Data

[62] Division of Ser. No. 587,719, Sep. 25, 1990.

[30] Foreign Application Priority Data

Sep. 27, 1989 [GB] United Kingdom ............ 8921828

[51] Int. Cl.$^5$ ............................................. B23B 51/04
[52] U.S. Cl. ................................. 408/204; 76/108.1; 408/703
[58] Field of Search ............... 408/203.5, 204–207, 408/703; 76/108.1, 108.2, 108.6, 115

[56] References Cited

U.S. PATENT DOCUMENTS 3,610,768 10/1971 Cochran .......................... 408/204
4,208,154 6/1980 Gundy ............................ 408/204

FOREIGN PATENT DOCUMENTS

| | | |
|---|---|---|
| 358625 | 5/1929 | Belgium . |
| 57-211408 | 12/1982 | Japan . |
| 62-39113 | 2/1987 | Japan . |
| WO8301918 | 6/1983 | PCT Int'l Appl. . |
| 611657 | 11/1948 | United Kingdom . |
| 646850 | 11/1950 | United Kingdom . |
| 911093 | 11/1962 | United Kingdom . |
| 914573 | 1/1963 | United Kingdom . |
| 1104798 | 2/1968 | United Kingdom . |
| 2182588 | 5/1987 | United Kingdom . |

*Primary Examiner*—Steven C. Bishop
*Attorney, Agent, or Firm*—Howard & Howard

[57] ABSTRACT

A tipped annular hole cutter is made by brazing all the cutting tips (30) simultaneously to the cylindrical wall (12) of the cutter body. The tips (30) have outer and inner lands (32, 34) which locate against the outer and inner surfaces (52, 54) of the cylindrical wall (12). This accurately locates the tips radially during brazing. The radially inner face (46) of the tip (30) is inclined so as to define an inner clearance face which has the necessary circumferential and radial clearances without therebeing any need to grind the inner face (46) after brazing.

11 Claims, 3 Drawing Sheets

ANNULAR HOLE CUTTER

This is a divisional of copending application Ser. No. 07/589,719 filed on Sep. 25, 1990.

This invention relates to a method of construction of an annular hole cutter.

Annular hole cutters are known having a hollow cylindrical cutter body with a plurality of cutting teeth arranged around a lower end thereof, and an upper end thereof adapted for mounting on a rotary driving member (see JP-A-57-211408). The cutting teeth can be of tungsten carbide or hard metal tips brazed to the lower end of a steel body. The body is usually made of heat treated high tensile steel, in order to resist the torsional forces exerted by the cutting action.

One major or drawback of the above construction is that it is extremely difficult to grind the radially inwardly facing flanks of the hard tips since the inner flanks must be inclined both to the tangent at the radius from the inner end of the cutting edge and to the axis of the cutter to provide the necessary clearance angles. Also, it is important that the inner end point of the cutting edge on each tip describes the same annular surface when rotated, otherwise non-uniform loading of the tips ensues. To grind a tip in-situ to this accuracy is extremely difficult. The abrasive wheels have, of necessity, to be of a small diameter and are subject to rapid wear and require frequent dressing.

A further disadvantage of the known construction is the accurate placement of the tips in the cutter body; locating the tips requires complicated placing and clamping means in order to minimise subsequent grinding operations.

JP-A-57-211408 discloses two projections on each of the tips of an annular hole cutter and these are said to engage the outer periphery of the cutter body to locate the tips accurately in a radial direction. However, clamps are needed to hold the tips in place and the inner flanks still require grinding.

It is an aim of the present invention to produce an annular hole cutter in which the accuracy of the positioning of the various cutting edges, clearance angles and rake angles is vastly improved and for which the manufacturing steps are simplified.

It is another object of the invention to manufacture a annular hole cutter in which the bits are positively prevented from radially inward and outward displacement without the use of clamps during brazing.

It is a further object of the invention to form the tips with the desired circumferential and axial clearances to their inner flanks and to locate the tips accurately during brazing so that the inner flanks require no grinding.

In accordance with the invention, in a method of manufacturing a tipped annular hole cutter, the tips have inner and outer lands and are located in slots provided in the annular cutter body such that, before the tips are brazed, the flank of each tip which faces radially inwardly is accurately located and is provided with circumferential and axial clearance so that the said flanks do not require subsequent grinding.

The method of construction of the annular hole cutter in accordance with the invention is described further hereinafter, by way of example only, with reference to the accompanying drawings, in which.

Figure 1:
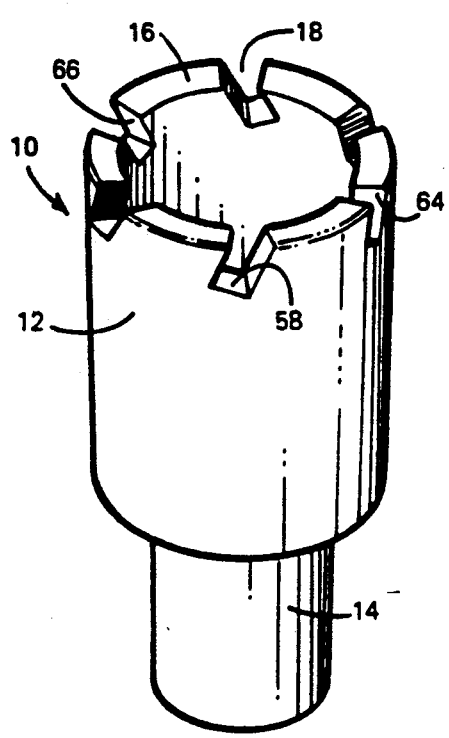
FIG. 1 is a perspective view of the blank for a cutter body in which the tip-receiving slots have been cut but before insertion of the tips in accordance with one embodiment of the present invention.

The drawings illustrate the manufacture of a tipped, fluted annular hole cutter. A blank 10 (FIG. 1) for the annular cutter body is machined to provide a hollow cylindrical wall 12 and a drive shank 14. Equally circumferentially spaced slots 18 are machined into the annular end face 16 of the cylindrical wall 12 and are oriented in a skew fashion as shown.

Figure 4:
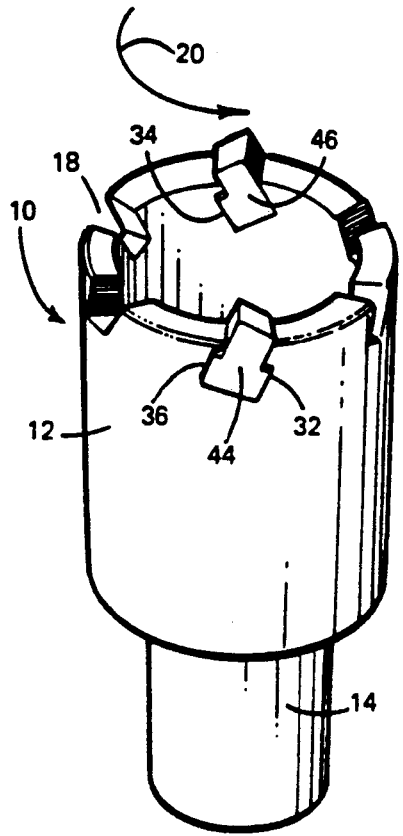
FIG. 4 is a perspective view of the cutter body with some of the tips installed.
Figure 2:
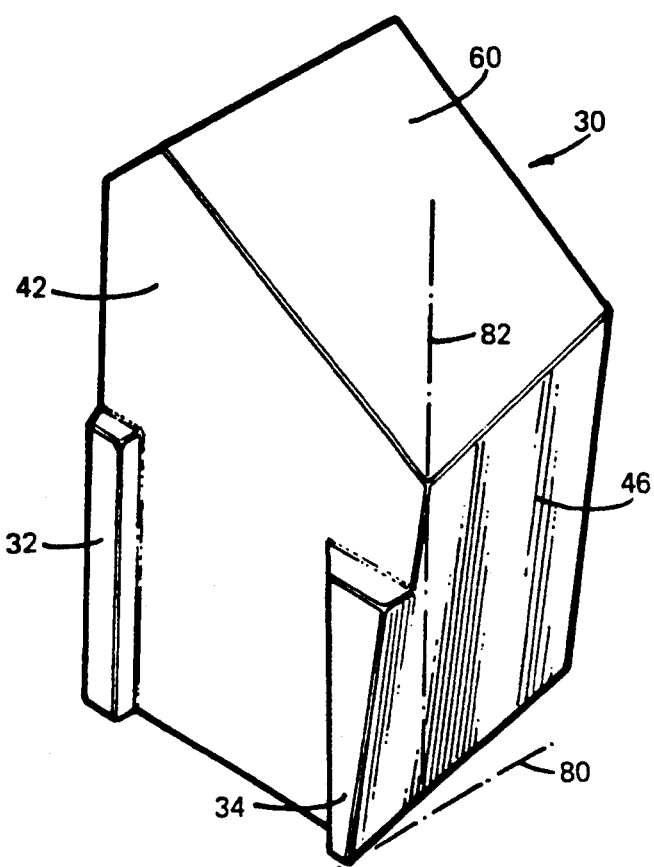
FIG. 2 is a perspective front view, to a larger scale, of one of the tips for insertion in the slots illustrated in FIG. 1.
Figure 3:
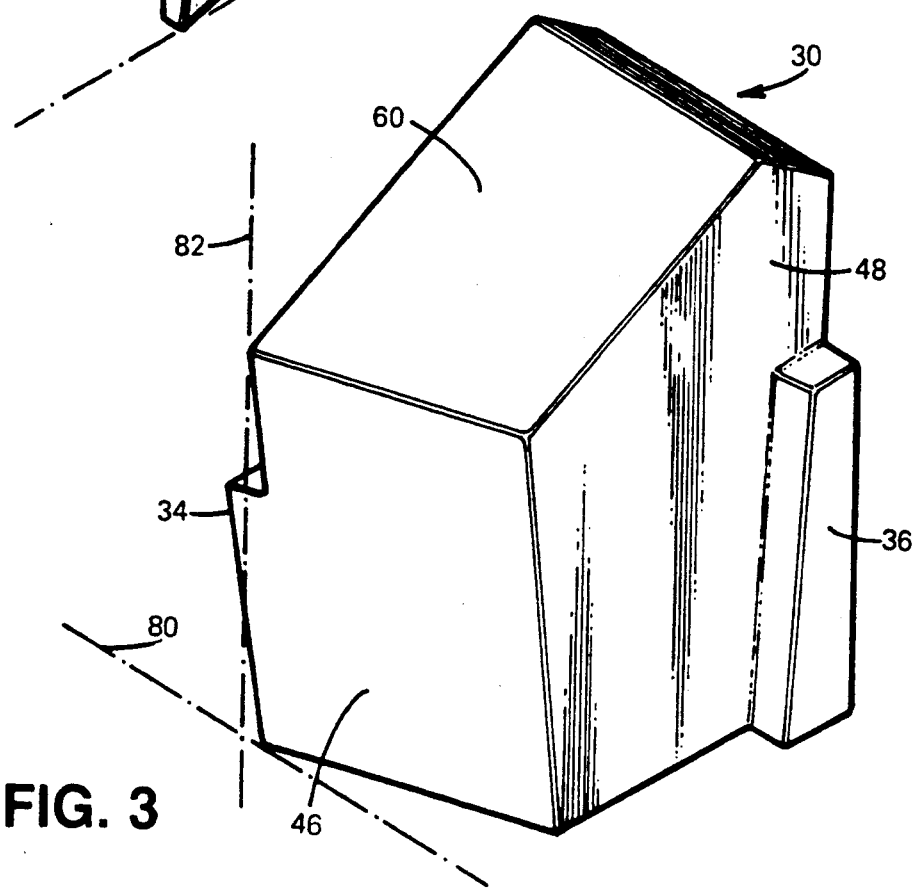
FIG. 3 is a perspective rear view of the tip of FIG. 2.

FIGS. 2 and 3 illustrate one of the sintered carbide tips 30 designed to fit in the slots 18. Each tip 30 has two lands 32 and 34 on a first face 42 and one land 36 on a second face 48 opposed to the first face. The lands 32, 34, 36 serve as runners to guide the tip 30 into the respective slot 18 as shown in FIG. 4 so that the first face 42 becomes the leading face as seen in the intended direction of rotation 20 and the second face 48 becomes the trailing face.

The first land 32 comprises an elongate rectangular rib or flange which extends along the edge of the leading face 42 adjacent the flank 44 which becomes the radially outer flank in the assembled state. The second land 34 comprises an elongate tapered rib or flange which extends along the edge of the leading face 42 adjacent the radially inner flank 46. The third land 36 also comprises an elongate tapered rib or flange. It extends along the edge of the trailing face 46 adjacent the radially outer flank 44. The outer leading and trailing lands 32 and 36 cooperate with the outer surface 52 of the cylindrical wall 12 whereas the inner leading land 34 co-operates with the inner surface 54 of the cylindrical wall 12. The tips 30 stand proud of the slots 18 when assembled, as can be seen from FIGS. 4 and 6, when the bottom faces 56 of the tips are seated against the bottoms 58 of the slots 18. Thus, there is no need for the lands 32, 34, 36 to extend right up to the top face 60 of the tip 30.

Figure 5:
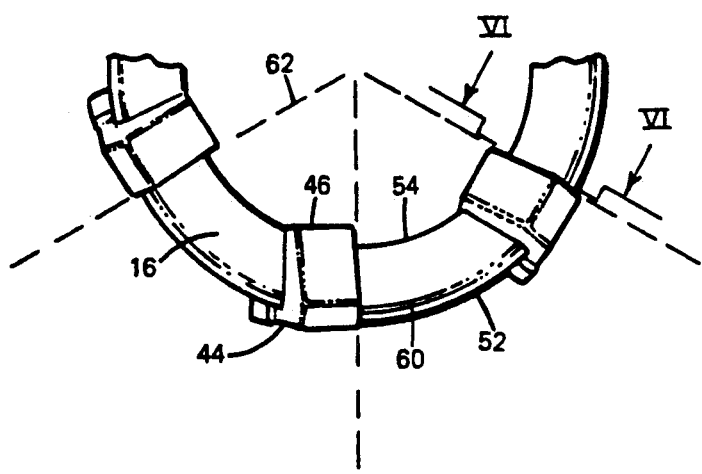
FIG. 5 is a fragmentary plan view of the cutter body with the tips installed.
Figure 6:
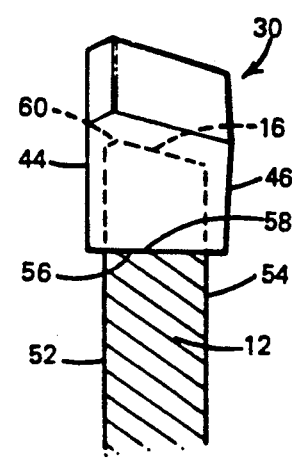
FIG. 6 is a fragmentary-sectional view along the lines VI—VI of FIG. 5.

The end face 16 of the cylindrical wall 12 is shallow conical, as can be seen in FIG. 6 and its outer edge 60 may have a slight bevel. FIG. 5 shows radii 62 drawn in a radial plane through this outer edge 60. As also shown in FIG. 5, these radii lie substantially in the planes of the respective leading side faces 64 (FIG. 1) of the slots 18. This, together with the rectangular shape of the leading outer land 32 ensures that the tips 30 are correctly oriented and located before the brazing step hereinafter described. Because the slots 18 are skewed and because their trailing side faces 66 (FIG. 1) are parallel to the leading side faces 64, respectively, the trailing outer land 36 must be tapered as shown in FIG. 3 to fit snugly against the outer cylindrical surface 52. The inner land 34 fits snugly against the inner cylindrical surface 54. It is tapered because the inner flank 46 is inclined to the cutter axis as will be described later.

Thus, the tips 30 can be placed in position in the slots 18 by hand and can be retained in these slots, with the cutter body oriented with its end face 16 uppermost, by a simple hand operation without the need for any clamping and positioning devices. The tips 30 are them simultaneously brazed in place by placing spelter in the region of each tip location and by heating the cutter body 10 uniformly about its circumference. It is sufficient to heat the upper end portion of the cylindrical wall 12 e.g. by induction heating. This is much quicker than brazing each tip individually and the circumferential uniformity of heating ensures a minimum of warping of the cutter body.

Figure 7:
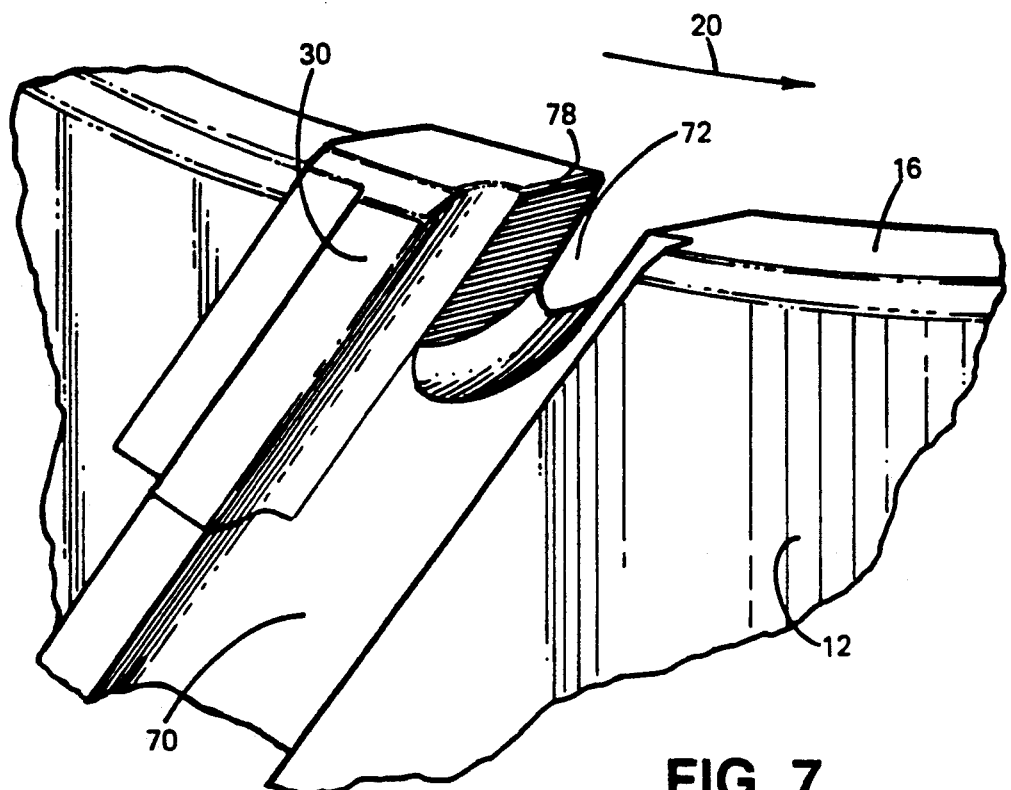
FIG. 7 is a perspective detail of part of the cutter after brazing and grinding.
Figure 8:
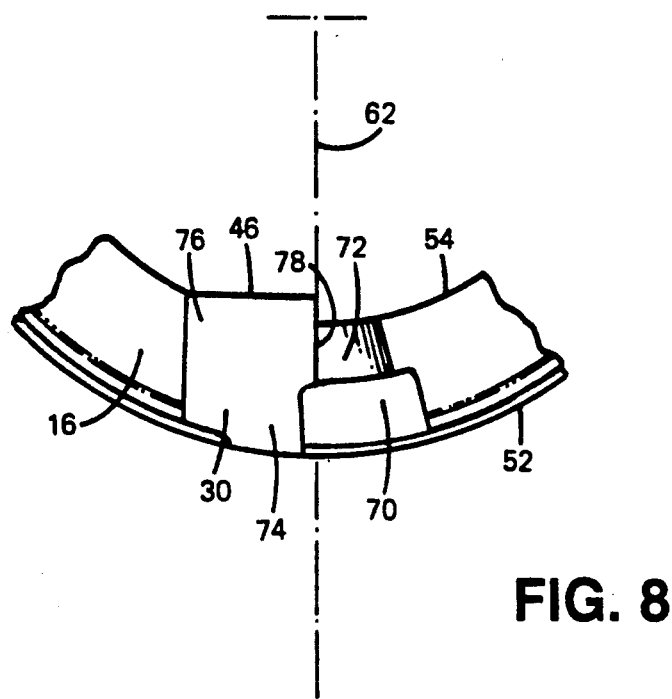
FIG. 8 is a fragmentary plan view of the cutter with tip brazed and ground.

After brazing, the annular hole cutter is finished by grinding. After the outer surface 52 of the cutter has been ground down to the correct diameter, and this includes grinding material off the outer flanks 44 of the tips 30, spiral flutes 70 are ground into the outer surface, as shown in FIGS. 7 and 8. Thereafter gullets 72 are ground in the end face 16 adjacent the tips 30 so as to communicate with the flutes 70. Finally the top faces 60 of the tips are ground to form outer and inner end clearance faces 74 and 76 which slope radially outwardly and inwardly, respectively. Flates (not shown) can be ground in the shank 14 for engagement by clamping screws on the spindle of the drilling machine to which the annular hole cutter is to be fitted.

A cutting edge 78 is formed where the end clearance faces 74, 76 meet the flute 70 and the gullet 72. However, a finish griding operation can be performed on the forward face of each tip 30 to produce the desired front rake angle.

According to the invention, it is unnecessary to grind the radially inner flanks 46 of the tips 30. As can be seen from FIGS. 2 and 3, the radially inner flank 46 is inclined, both with respect to a tangent line 80 to the inner periphery of the cutter body at the cutting edge 78 and with respect to the vertical line 82. Circumferential and axial clearances are thereby imparted to the inner flank 46. Because the tip 30 is fitted in a skewed orientation in the cutter body, the tangent line 80 is slightly inclined to the horizontal (with the cutter located upright) and is therefore not a true tangent and the vertical line 82 is not quite parallel to the cutter axis. However the desired circumferential and axial clearances at the inner periphery of the annular hole cutter are obtained without grinding the inner faces 46 of the tips 30. The accurate radial location of the tips 30 by virtue of the outer and inner lands 32, 34, 36 is also essential for avoidance of grinding the inner flanks 46, as otherwise the inner end points of the cutting edges 78 would describe circles of differing diameters, leading to non-uniform tip loading.

Because the tips 30 are made by a sintering process, be they tungsten carbide, hard metal or even ceramic, the powder from which they are made must be compacted under high pressure in a mould, the tip face 60 cannot be formed at an angle to provide the desired end clearance angle, the top face initially slopes in the wrong circumferential direction, as can be seen by comparing FIGS. 4 and 7. However, it is relatively easy to grind the top faces as they are readily accessible and can be ground using a relatively large diameter grinding wheel which doesn't require frequent dressing. It is possible to design the lands 32, 34, 36 on a given tip 30 to suit a range of cutter diameters, thereby reducing the number of different tips needed to cover a full range of diameters.

The cutters made in accordance with the invention are intended for cutting relatively large diameter holes in hard metals, where ordinary twist drills would consume too much power, but may also be used for concrete and masonry.

I claim:

1. A tipped annular hole cutter comprising a body having a cylindrical wall with outer and inner surfaces and a free end surface, and tips secured to said cylindrical wall by metal fusion, the tips being in said wall end surface and defining respective cutting edges, each said tip defining an unground inner clearance face with predetermined circumferential and axial clearances;

each said tip having locating means thereon accurately radially locating said tips within said cutter body, the locating means on each said tip including an inner land adjoining said inner clearance face and engaging said inner surface of said body.

2. An annular hole cutter according to claim 1, wherein said cylindrical wall has tip-receiving slots therein which extend with a preselected orientation from said free end surface of said wall, said cutter body having an intended direction of rotation about an axis of rotation, and wherein each said tip includes a leading face, a trailing face, an inner face, an outer face, a tip surface and a bottom face, said inner face having a preselected inclination, and said tips are received in said slots so that said leading faces of said tips face in said intended direction of rotation, said preselected inclination of said tip inner face being so chosen in relation to the preselected orientation of said slots that the tip inner face defines said unground inner clearance face.

3. An annular hole cutter according to claim 2, wherein said preselected inclination is so chosen that said unground inner clearance face has both circumferential and axial clearance.

4. An annular hole cutter according to claim 1, further comprising spiral flutes in an outer surface of said cylindrical wall and gullets in said wall end surface.

5. A tipped annular hole cutter comprising a body having a cylindrical wall with outer and inner surfaces and a free end surface, and tips secured to said cylindrical wall by metal fusion, the tips being in said wall end surface and defining respective cutting edges, each said tip defining an unground inner clearance face with predetermined circumferential and axial clearances;

said tips include locating means for accurately locating said tips within said cutter body, said locating means including three lands, a first land extending partially along a peripheral edge of a first surface of said tip, a second land extending along the peripheral edge of the first surface opposite said first land and a third land extending along the edge of a second surface, opposite the first surface of the tip such that the third land is opposite the first land.

6. An annular hole cutter according to claim 5, wherein said first and third lands cooperate with the outer surface of said cylindrical wall and said second land cooperates with the inner surface of said cylindrical wall.

7. An annular hole cutter according to claim 5, wherein said first land is substantially rectangular, and said second and third lands are tapered to fit snugly against the inner and outer cylindrical surfaces respectively.

8. An annular hole cutter according to claim 5, wherein said second and third lands each have a base adjacent said bottom face of said tip and a top, said second land having a smaller base tapering to larger top and said third land having a larger base tapering to a smaller top.

9. An annular hole cutter according to claim 5, wherein said lands extend partially along the edge of each respective surface.

10. An annular hole cutter according to claim 5, wherein said first and second lands are on the leading surface of said tip and said third land is on the trailing surface of said tip.

11. An annular hole cutter according to claim 7, wherein said tip-receiving slots have leading side faces which lie in radial planes, said leading side faces cooperating with said substantially rectangular first land to ensure proper orientation of said tips.

* * * * *